(12) United States Patent
Zhang et al.

(10) Patent No.: US 11,598,915 B2
(45) Date of Patent: Mar. 7, 2023

(54) ANTI-TORSION SOLID-CORE POLARIZATION-MAINTAINING PHOTONIC CRYSTAL FIBER BASED ON ANISOTROPY OF STRESS DISTRIBUTION

(71) Applicant: BEIHANG UNIVERSITY, Beijing (CN)

(72) Inventors: Chunxi Zhang, Beijing (CN); Jingming Song, Beijing (CN); Ningfang Song, Beijing (CN); Zhiyu Guo, Beijing (CN); Zuchen Zhang, Beijing (CN); Yan Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 17/406,945

(22) Filed: Aug. 19, 2021

(65) Prior Publication Data
US 2022/0057569 A1 Feb. 24, 2022

(30) Foreign Application Priority Data

Aug. 24, 2020 (CN) .......................... 202010857097.3

(51) Int. Cl.
G02B 6/02 (2006.01)
G02B 6/024 (2006.01)

(52) U.S. Cl.
CPC ......... *G02B 6/024* (2013.01); *G02B 6/02295* (2013.01); *G02B 6/02323* (2013.01);
(Continued)

(58) Field of Classification Search
CPC ............ G02B 6/02295; G02B 6/02304; G02B 6/02323; G02B 6/02347; G02B 6/02366; G02B 6/02371; G02B 6/024
See application file for complete search history.

(56) References Cited

U.S. PATENT DOCUMENTS 7,289,709 B2 * 10/2007 Folkenberg ............ G02B 6/024
385/11
7,841,213 B2 * 11/2010 Kinoshita ........... C03B 37/0122
65/393

(Continued)

FOREIGN PATENT DOCUMENTS

CN 106154402 A 11/2016
CN 108873157 A 11/2018

*Primary Examiner* — Ryan A Lepisto
(74) *Attorney, Agent, or Firm* — Pai Patent & Trademark Law Firm; Chao-Chang David Pai

(57) ABSTRACT

An anti-torsion solid-core polarization-maintaining photonic crystal fiber includes a cladding having an inner layer arranged around the core and an outer layer between the inner layer and the outer wall of the cladding. The inner layer has multi-layer air holes used to construct optical properties and two micron-size air holes arranged along the x-axis extending in the center producing form birefringence. The outer layer includes multi-layer air holes arranged radially along the y-axis. The size and arrangement of the multi-layer air holes in the outer layer cause the bending stiffness of the photonic crystal fiber along the x-axis to be different from that along the y-axis. While meeting the requirements of the optical properties of the fiber, the photonic crystal fiber possesses an anti-torsion ability due to the anisotropy of stress distribution in the radial direction, thereby reducing the non-reciprocal phase difference generated by the magneto-optic Faraday Effect.

4 Claims, 6 Drawing Sheets

(52) U.S. Cl.
    CPC ..... *G02B 6/02338* (2013.01); *G02B 6/02347* (2013.01); *G02B 6/02357* (2013.01); *G02B 6/02366* (2013.01); *G02B 6/02371* (2013.01); *G02B 6/02304* (2013.01)

(56) References Cited

U.S. PATENT DOCUMENTS

| | | | |
|---|---|---|---|
| 8,958,676 B2* | 2/2015 | Geernaert | G01D 5/35316 385/125 |
| 9,915,779 B2* | 3/2018 | Song | G02B 6/02371 |
| 2005/0084223 A1* | 4/2005 | Tanaka | G02B 6/024 385/125 |
| 2012/0224811 A1 | 9/2012 | Geernaert et al. | |
| 2021/0405287 A1* | 12/2021 | Chenard | G02B 6/02342 |

* cited by examiner

Fast axis direction

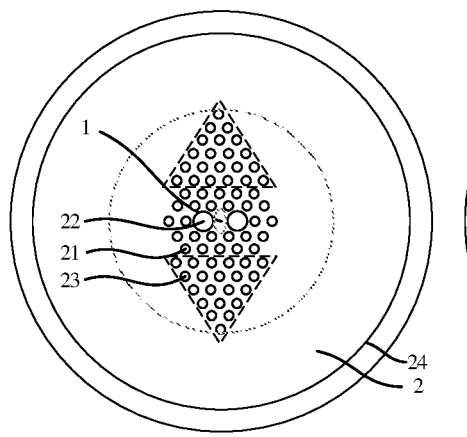
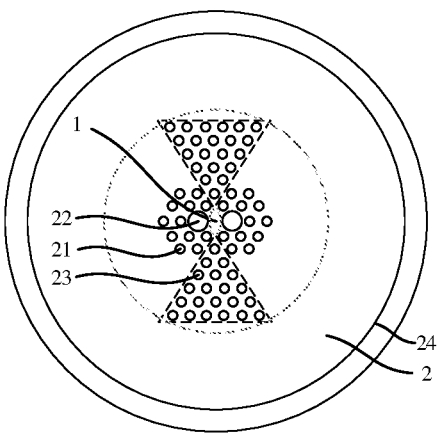
FIG. 8A     FIG. 8B
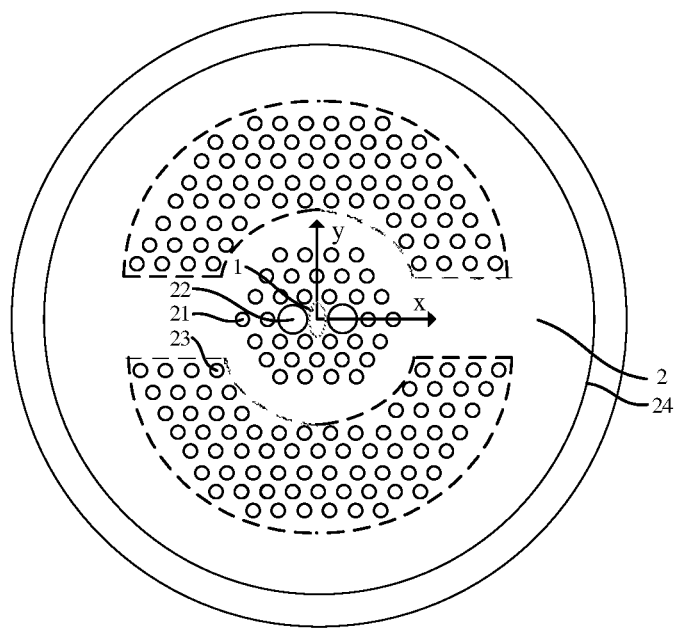
FIG. 9

US 11,598,915 B2

ANTI-TORSION SOLID-CORE POLARIZATION-MAINTAINING PHOTONIC CRYSTAL FIBER BASED ON ANISOTROPY OF STRESS DISTRIBUTION

BACKGROUND OF THE INVENTION

Field of the Invention

The present invention relates to the field of optical fiber sensing, and specifically to an anti-torsion solid-core polarization-maintaining photonic crystal fiber based on anisotropy of stress distribution.

Description of the Prior Art

The cladding of photonic crystal fiber is composed of air holes arranged according to certain rules, and is different from that of traditional fiber. By designing the number, size, spacing and other structural parameters of the cladding air holes, the equivalent refractive index of the cladding can be adjusted, and the light waves with different propagation characteristics can be obtained to meet different characteristics and needs. Due to the high freedom in designing photonic crystal fibers, high birefringence solid-core polarization-maintaining photonic crystal fibers can be manufactured to meet the requirements of the fiber optic gyroscope (FOG) by arranging the air hole arrays according to a certain rule. A conventional solid-core polarization-maintaining photonic crystal fiber is shown in FIG. 1. Its array consists of air holes of two sizes, and the two larger holes in the central region are used to destroy the circular symmetry of the fiber core and produce the form birefringence.

When a high birefringence photonic crystal fiber is fabricated into a fiber coil, natural parasitic twist occurs in the direction of the principal axis due to the perturbation caused by friction and other additional forces during the winding process. As shown in FIG. 2, the fast axis direction of the fiber ring section is inconsistent. As shown in FIG. 3, the parasitic twist of the fiber birefringence axis brings in an additional circular birefringence vector $\Delta\beta_2$, which is added to the linear birefringence vector $\Delta\beta_1$ to obtain the total birefringence $\Delta\beta$, resulting in the polarization state of the light transmitted, which in practice is similar to elliptically polarized light. Under the magneto-optic Faraday Effect, the above parasitic twist will introduce non-reciprocal phase differences. Let $t_w$ be the rate of parasitic twist, then the accumulated Faraday phase difference $\Delta\varnothing_F$ is $$\Delta\varnothing_F = \frac{2VB}{\Delta\beta_1} \int_{ClosedPath} t_w(Z)\cos\left(\frac{z}{R} - \theta_B\right)dz,$$

where B is the magnetic induction, z is the integration variable, $\theta_B$ represents the angle of the magnetic induction B with respect to the reference axis, V is the Verdet constant and R is the radius of the optical fiber coil.

The above factors will reduce the performance of the high birefringence photonic crystal fiber. When the prepared high birefringence photonic crystal fiber is directly used in an FOG, the Faraday magnetic sensitivity of the FOG will be increased, the polarization reciprocity will be reduced, and the random phase difference will be introduced. At present, the solution to the above problems is mainly to cover a magnetic shielding case on the fiber coil. But this will lead to an increase of the preparation cost and an increase in the volume and quality of FOG, hindering the development of FOG in the direction of lightweight and miniaturization.

BRIEF SUMMARY OF THE INVENTION

In order to reduce the Faraday magnetic sensitivity of the fiber optic gyroscope (FOG), it can be obtained from the above accumulated Faraday phase difference formula that the nonreciprocal phase difference can be effectively suppressed by reducing the parasitic twist rate $t_w$ of the photonic crystal fiber. Based on it, the present invention designs an anti-torsion solid-core polarization-maintaining photonic crystal fiber based on anisotropy of stress distribution, which is realized by providing a multi-layer air hole structure along the radial direction outside the cladding of the existing high birefringence and low loss photonic crystal fiber. The existence of the outer multi-layer air holes results in the bending stiffness of the fiber different in two vertical directions. The expected bending stiffness difference can be obtained by optimizing over the size and arrangement of these air holes.

The present invention provides an anti-torsion solid-core polarization-maintaining photonic crystal fiber based on anisotropy of stress distribution. The cladding of the photonic crystal fiber includes the inner layer arranged around the core and the outer layer between the inner layer and the outer wall of the cladding. The inner layer has multi-layer air holes for constructing optical properties and the center has two micron-size air-holes arranged along the x-axis. The outer layer includes multi-layer air holes arranged radially along the y-axis. The x-axis and the y-axis are perpendicular to each other. The inner layer and the outer layer are symmetric with respect to the x-axis and the y-axis as a whole. It is understood that the bending stiffness difference of the photonic crystal fiber along x-axis and y-axis is related to the size, number and arrangement of the air holes in the cladding. The pore size, number and arrangement of the multi-layer air holes in the outer layer are configured in a way to realize the desired difference of bending stiffness of the photonic crystal fiber along the x-axis and y-axis.

Preferably, the air holes in the outer layer are unevenly arranged in the radial direction.

Preferably, there are spaces set between the outer wall of the cladding and the air holes in the outer layer.

Preferably, the air holes in the outer layer all of the same aperture or size.

Preferably, the bending stiffness difference of the photonic crystal fiber along x-axis and y-axis is 0~70%.

Preferably, the air holes in the outer layer are arranged to be evenly distributed and enclosed in two equilateral triangles above and below the x-axis respectively, and the equilateral triangles each have a side parallel to the x-axis and corresponding to an inner or outer border of the outer layer.

Preferably, the air holes in the outer layer are arranged along multiple circular arcs.

The beneficial effect of the present invention:

1) The photonic crystal fiber provided by the present invention has lower parasitic twist when it is wound into a coil, therefore the fiber optic gyroscope using the fiber has lower magnetic sensitivity when working in the geomagnetic field or space magnetic field for a long time and can reduce the non-reciprocal error to a certain extent.

2) The fiber provided by the present invention will bend in the direction of lower bending stiffness during the winding process, so the internal stress in the fiber coil has only one direction for the fiber center. Then the polarization crosstalk in the fiber coil is reduced, thus decreasing the nonreciprocal polarization error of FOG.

3) The present invention retains the optical design in the inner layer of the photonic crystal fiber cladding to ensure that the fiber meets the optical characteristics of high birefringence and low loss, and meets the requirements of the FOG system. The mechanical configuration is designed and optimized in the outer layer, and the difference of stress distribution is realized by various arrangements of air holes along different radial directions to improve the intrinsic anti-torsion ability of the optical fiber.

4) The present invention has high feasibility: The structure of air hole arrangements used by the inner and outer layers of the present invention could be produced by a mature process at the current industrial level with low preparation difficulty.

5) The present invention can remove the outer magnetic shielding case of the optical fiber within a certain precision requirement, greatly reduce the volume and mass of the FOG, broaden the application fields of the FOG, and promote the development of lighter and smaller FOG.

BRIEF DESCRIPTION OF THE DRAWINGS

FIG. 8A shows an alternative embodiment of the photonic crystal fiber based on anisotropy of stress distribution with air holes in the outer layer evenly distributed and enclosed in two equilateral triangles. FIG. 8B shows another alternative embodiment of the photonic crystal fiber with the equilateral triangles in FIG. 8A inverted.

FIG. 9 shows the arrangement of air holes in the cladding of the photonic crystal fiber based on anisotropy of stress distribution according to Embodiment 2 of the present invention.

DETAILED DESCRIPTION OF THE INVENTION

The invention provides a photonic crystal fiber to realize the optical and mechanical properties of the fiber optic gyroscope (FOG) by using the high flexibility of the photonic crystal fiber, so that the optical properties of the photonic crystal fiber are guaranteed by the multi-layer air holes in the inner layer of the cladding, and the design of the outer layer of the cladding further reduces the cladding equivalent refractive index, thereby limiting the loss in the fiber.

Figure 1:
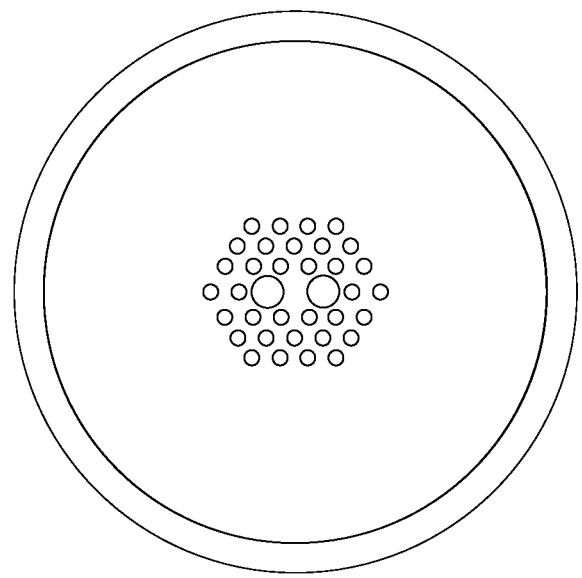
FIG. 1 shows the arrangement of air holes in the cladding of the conventional polarization-maintaining photonic crystal fiber.
Figure 2:
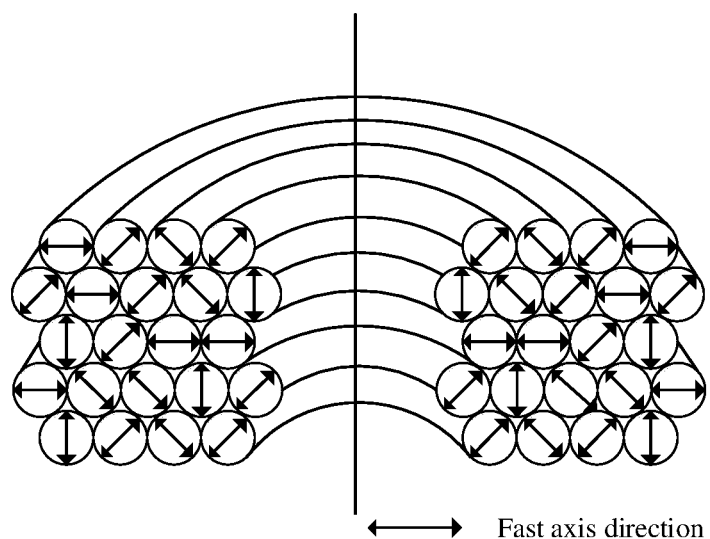
FIG. 2 shows the distribution in the direction of the fast axis on a cross section of the conventional polarization-maintaining photonic crystal fiber coil.
Figure 3:
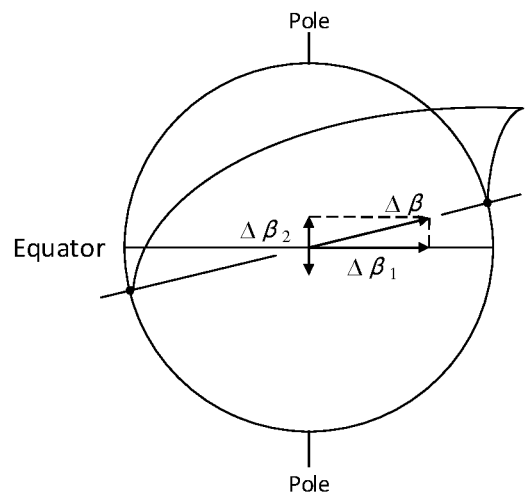
FIG. 3 is a schematic diagram describing the approximate elliptical polarization state of the propagating beam in the polarization-maintaining photonic crystal fiber using the Poincaré sphere.
Figure 4:
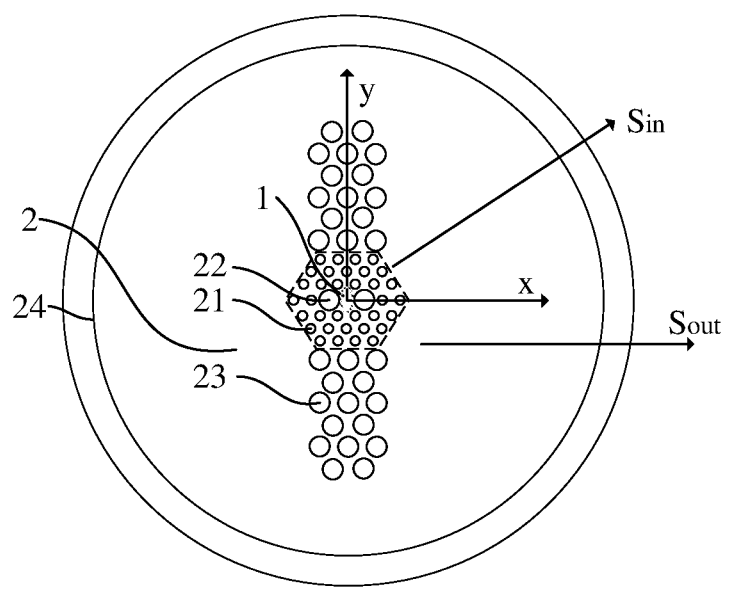
FIG. 4 shows the cross section of the air hole structure of the cladding of the photonic crystal fiber based on anisotropy of stress distribution according to Embodiment 1 of the present invention.

Specifically, as illustrated in FIG. 4, the anti-torsion solid-core polarization-maintaining photonic crystal fiber based on anisotropy of stress distribution in the present invention comprises a core 1 and a cladding 2, which includes an inner layer $S_{in}$ arranged around the core 1 and an outer layer $S_{out}$ between the inner layer $S_{in}$ and the outer wall of the cladding 2. The inner layer $S_{in}$ has first air holes 21 arranged in multiple layers or arrays for constructing optical properties and two micron-size air holes 22 arranged along an x-axis extending through the middle of the inner layer $S_{in}$ for producing form birefringence and maintaining the polarization state. This optical design is similar to general polarization-maintaining photonic crystal fiber and not considered as the innovation of the present invention. The outer layer $S_{out}$ includes second air holes 23 arranged in multiple layers or arrays around a y-axis perpendicular to the x-axis. Preferably, the second air holes 23 are arranged radially along the y-axis, as in Embodiment 1 shown in FIG. 4. The inner layer $S_{in}$ and the outer layer $S_{out}$ are symmetric with respect to the x-axis and the y-axis as a whole. The x-axis and the y-axis here only represent two perpendicular directions. The existence of the second air holes 23 in the outer layer $S_{out}$ causes the bending stiffness of the photonic crystal fiber along the two vertical directions to be different. The desired bending stiffness difference can be obtained by optimizing the size and arrangement of the second air holes 23 to maximize the difference of stress distribution along the x-axis and along the y-axis. Therefore, the winding strategy can be properly adjusted when bending such a fiber to make the principal axis bend in the direction of lower bending stiffness, thus improving the intrinsic anti-torsion ability of the optical fiber.

In particular, the air hole array involved in the present invention is formed by stacking the air hole array according to certain geometric rules.

The invention is further described in conjunction with the accompanying figures and embodiments below. It shall be understood that the embodiments aim to facilitate the understanding of the present invention and not to play any restrictive role.

Embodiment 1

As shown in FIG. 4, the inner layer $S_{in}$ of the cladding 2 of the photonic crystal fiber based on anisotropy of stress distribution according to Embodiment 1 is made up of three layers of periodically and evenly distributed first air holes 21 arranged around the core 1, and the outer layer $S_{out}$ of the cladding 2 is disposed between the inner layer $S_{in}$ and the wall 24 of the cladding 2. The inner layer $S_{in}$ further includes two micron-size air holes 22 arranged along the x-axis extending through the middle of the inner layer $S_{in}$. The diameter of each micron-size air holes 22 is preferably 4-6 μm. The second air holes 23 of the outer layer $S_{out}$ are mainly distributed around the y-axis, which is perpendicular to the x-axis. The inner layer $S_{in}$ and the outer layer $S_{out}$ are symmetric with respect to the x-axis and the y-axis as a whole.

Figure 5B:
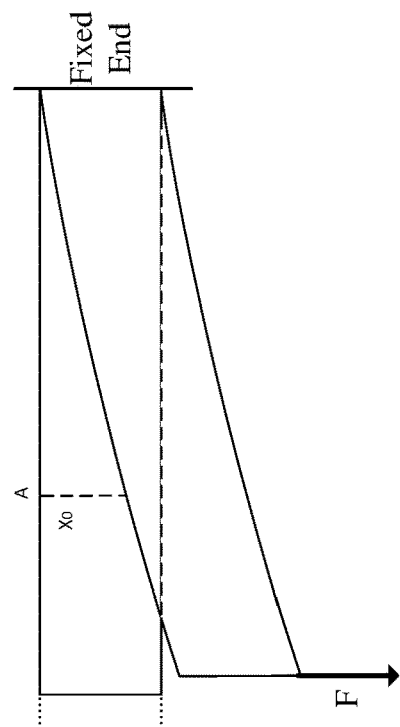
FIG. 5B shows the displacement of the photonic crystal fiber in FIG. 4 under pressure in a direction parallel to the x-axis.
Figure 5A:
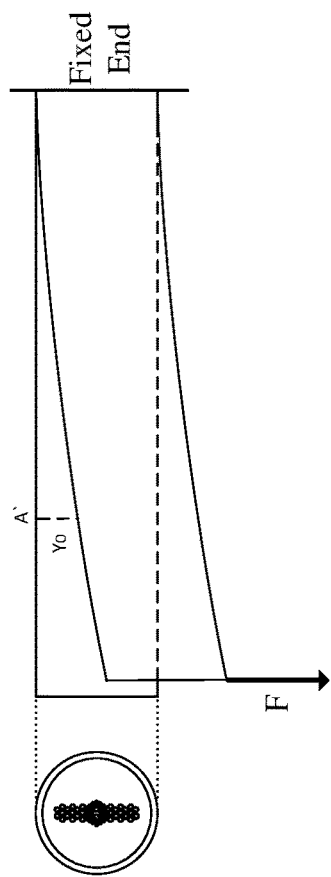
FIG. 5A shows the displacement of the photonic crystal fiber in FIG. 4 under pressure in a direction parallel to the y-axis.

In this embodiment, the difference of stress distribution between x-axis and y-axis is maximized by setting the second air holes 23 with uneven density along the radial direction in the outer layer $S_{out}$. In other words, as shown in FIG. 4, the columns of second air holes 23 on each same side of the y-axis have different numbers of second air holes 23. In order to measure the bending stiffness of the fiber in the x-axis and y-axis directions, a certain end of the fiber is fixed firstly, and then the radial pressure F of the same size and direction parallel to the y-axis and x-axis is applied to the other end of the fiber in the direction parallel to x-axis and the y-axis, respectively. The displacement of the same point on the fiber under the tension in the two directions are measured and compared. The results are shown in FIG. 5A and FIG. 5B, respectively. The tensile force parallel to the x-axis direction leads to a larger displacement of the fiber, which indicates that the stress distribution of the fiber structure in this embodiment has been differentiated in the two vertical directions, and the mechanical strength of the fiber in the two vertical radial directions are different. As a result of the difference, the principal axis of the fiber will bend towards the x-axis with lower bending stiffness when it is being wound, so that the fiber has a certain intrinsic anti-torsion ability.

Figure 6:
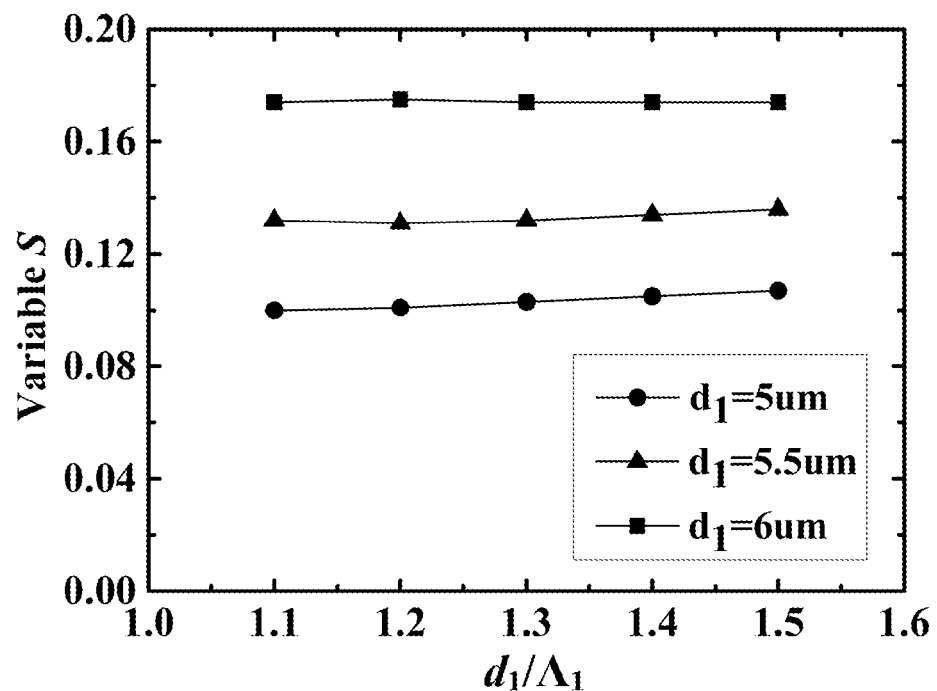
FIG. 6 shows the ratio of the difference in displacement to the average of the displacement, generated by the photonic crystal fiber based on anisotropy of stress distribution under pressure shown in FIG. 5A and FIG. 5B in Embodiment 1 of the present invention.

In the following, the structural parameters of the fiber are varied and optimized to obtain the ratio of the difference of the displacements to the average of the displacements generated by the fiber in the two scenarios shown in FIG. 5A and FIG. 5B. The simulation results are shown in FIG. 6. It can be seen from FIG. 6 that the larger the ratio of the difference of the displacements to the average of the displacements is, the larger the difference of the fiber's bending stiffness in the two vertical directions is, and the more obvious the difference of the fiber's stress distribution is. In FIG. 6, $d_1$ is the diameter of the second air holes 23 in the outer layer $S_{out}$, $\Lambda_1$ is the distance between the centers of two adjacent second air holes 23 in the outer layer $S_{out}$ and $d_1/\Lambda_1$ is defined as duty ratio for the outer layer $S_{out}$. The bending stiffness of the fiber is evaluated by a model as presented in FIG. 6. With one end fixed, the other end of the fiber is loaded with the same force along the x-axis and y-axis, separately. By comparing the deformation displacement in corresponding directions, the difference of bending stiffness of the fiber in the two perpendicular directions can be obtained. The displacement of the sampling points A and A' are denoted as $X_0$ and $Y_0$, and the variable S for evaluating the difference of bending stiffness is defined as:

$$S=|X_0-Y_0|/\text{avg}\{X_0,Y_0\},$$

where $|X_0-Y_0|$ means the absolute value of the difference between $X_0$ and $Y_0$, and $\text{avg}\{X_0, Y_0\}$ means the smaller value between $X_0$ and $Y_0$. A larger value of S indicates a greater difference of the bending stiffness in perpendicular directions.

Figure 7:
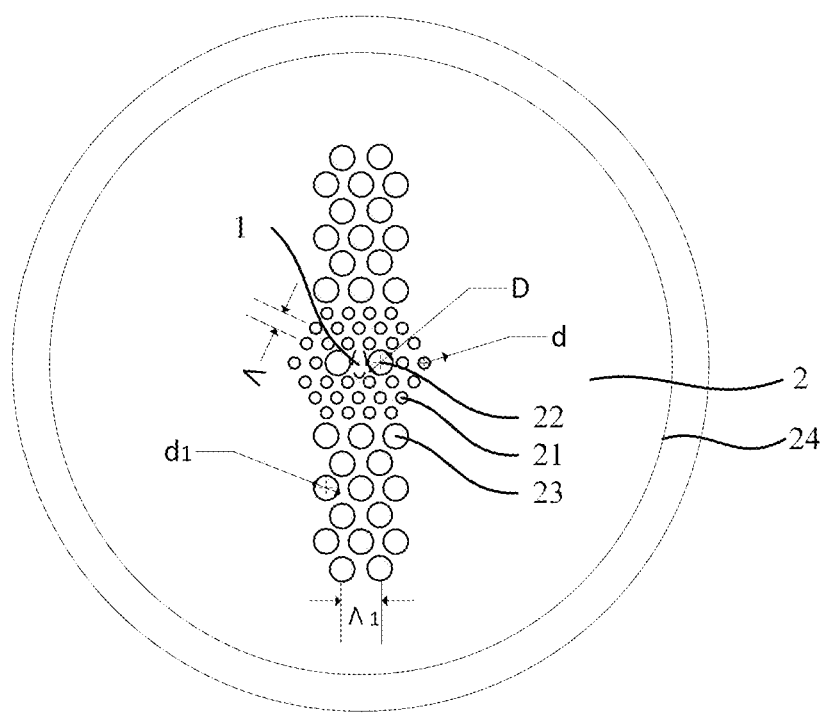
FIG. 7 shows the structural parameters of the photonic crystal fiber of the present invention shown in FIG. 4.

According to the simulation results and based on engineering practice experience, the following may be established. For the embodiment shown in FIG. 7: in the inner layer $S_{in}$, the diameter of the micron-size air hole 22 is D=5.7 μm, the diameter of the first air holes 21 is d=3.1 μm, and the distance between the centers of adjacent first air holes 21 is Λ=5.6 μm; in the outer layer $S_{out}$, the distance between the centers of adjacent second air holes 23 is $\Lambda_1$=7.2 μm, the maximum difference of stress distribution can be brought about when the diameter of the second air holes 23 is $d_1$=6 μm, and the variable S can reach about 12%. In addition, after simulation verification, it is found that the presence of the outer layer $S_{out}$ can further reduce the limiting loss of the fiber, while other optical properties of the fiber can remain unchanged. The first air holes 21 in the inner layer $S_{in}$ are preferably arranged in a honeycomb structure in the central area of the fiber.

Preferably, in order to ensure the strength of the fiber, it is necessary to reserve a certain space between the outer wall 24 of the cladding 2 and the second air holes 23 in the outer layer $S_{out}$ to prevent the fracture of the walls of the second air holes 23 when the fiber is bent.

In particular, this embodiment arranges the second air holes 23 in the outer layer $S_{out}$ radially with uneven distribution around the y-axis, rather than the x-axis, so the fiber twists to the x-axis. After the fiber winding, the compression between the fibers presses the fiber on the x-axis, which causes slight deformation of the fiber along the x-axis. The elastic-optical effect and deformation caused by the pressure will increase the birefringence inside the fiber, improve the polarization-maintaining ability of the fiber coil, and further meet the demand of the FOG on the fiber's high birefringence. The inner layer $S_{in}$ of the fiber cladding 2 plays a role in limiting the propagation mode of light waves. In the first circle or layer of first air holes 21 near the fiber core 1, two micron-size air holes 22 along the x-axis are used to destroy the circular symmetry of the fiber core 1 and produce the form birefringence. After simulation, the birefringence reaches the magnitude of $10^{-4}$, and the loss of the fiber meets the requirement of the FOG, which is 2 dB/km, thereby meeting the requirements of FOG for optical characteristics such as high birefringence and low loss of fiber. During winding, the principal axis of fiber will bend towards the x-axis with lower bending stiffness, so the pressure in the x-axis direction will further reduce the circular symmetry of the central region. Therefore, arranging the second air holes 23 in the outer layer $S_{out}$ around the y-axis will cause the photonic crystal fiber to have a larger birefringence after the fiber coil is prepared.

It should be noted that the structure of the outer layer $S_{out}$ designed in the present invention is based on the first air holes 21 and the micron-size air holes 22 in the inner layer $S_{in}$, and the configuration of the second air holes 23 in the outer layer $S_{out}$ is not limited to the one described above. A variety of configurations of the outer layer $S_{out}$ can be designed on the basis of the inner layer $S_{in}$. Different arrangements of air holes 21/22 in the inner layer $S_{in}$ and second air holes 23 in the outer layer $S_{out}$ will result in different degrees of anisotropy of stress distribution. Therefore, the arrangement of the second air holes 23 in the outer layer $S_{out}$ can be adjusted according to the actual needs, and the optimal results of each configuration can be obtained by varying the geometric parameters such as size, spacing and uniformity. For example, the second air holes 23 in the outer layer $S_{out}$ can be evenly distributed and enclosed in two equilateral triangles each with one side parallel to the x-axis and corresponding to the inner border of the outer layer $S_{out}$ (or next to the inner layer $S_{in}$) as shown in FIG. 8A, or with one side parallel to the x-axis and corresponding to the outer border of the outer layer $S_{out}$ as shown in FIG. 8B, and so on.

The structural optimization of the invention is to weaken the structural strength of a relatively small portion of the fiber, and then weaken the bending stiffness in that direction while retaining the bending stiffness in other directions, so as to realize the differential distribution.

Embodiment 2

Figure 10:
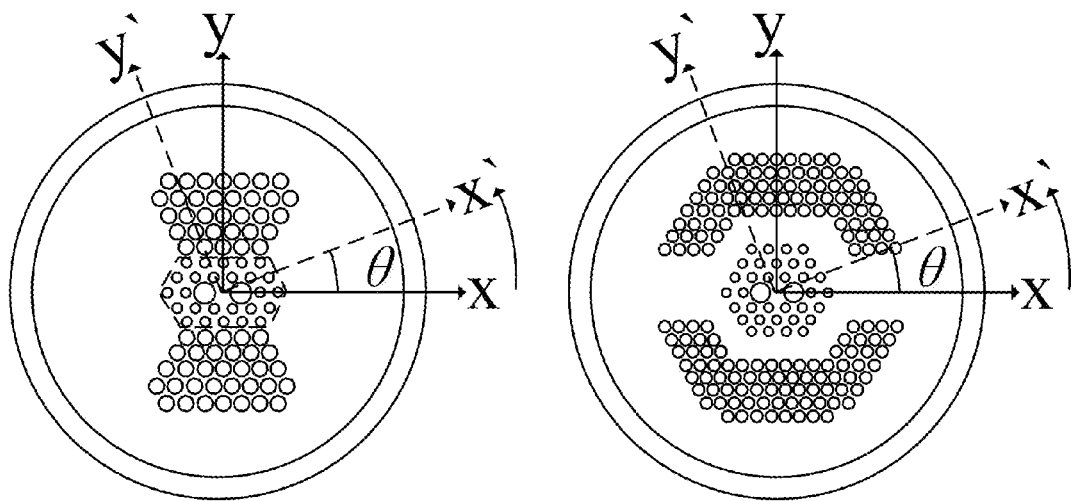
FIG. 10 shows the simulation model in which two mutually perpendicular forces are applied at different angles from the axes of symmetry on the photonic crystal fibers according to Embodiment 1 and Embodiment 2 of the present invention.

FIG. 9 shows a second embodiment (Embodiment 2) of the photonic crystal fiber of the present invention. The arrangement of second air holes 23 in embodiment weakens the structural strength of a relatively larger portion (compared to Embodiment 1 in FIG. 4) in the fiber, and then weakens the bending stiffness in most directions, retaining only the bending stiffness in a small range of specific directions. Although the results of the Embodiment 1 and Embodiment 2 are similar, they are based on two completely opposite design ideas. As shown in FIG. 10, the variable S is computed when θ varies from 0° to 45° by changing the directions of the two mutually perpendicular forces applied to the photonic crystal fiber of Embodiment 1 and Embodiment 2, respectively, where θ is the angle between the two forces and the two axes (x-axis and y-axis).

Figure 11:
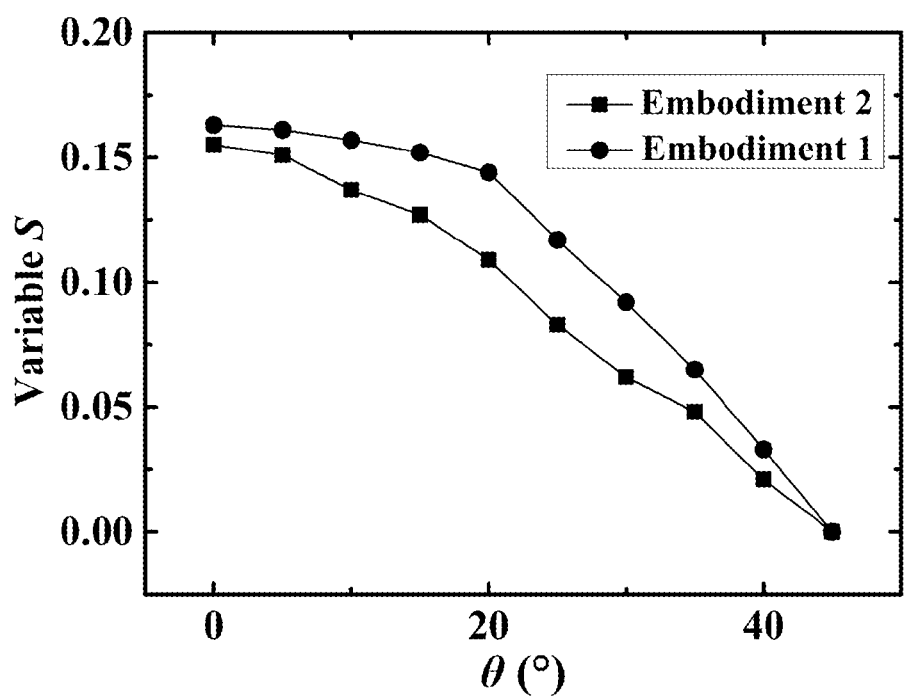
FIG. 11 shows the changes in bending stiffness of the photonic crystal fiber when the two mutually perpendicular forces are applied at different angles according to Embodiment 1 and Embodiment 2 of the present invention.

The results shown in FIG. 11 indicate that the variable S shows similar trends for the fibers of both embodiments as the angle θ varies. The inverse relationship between S and θ demonstrates that the most differentiated bending strength distribution is achieved when the two forces are applied along the x-axis and the y-axis.

In addition, the structure of the outer layer of Embodiment 2 is not limited to the one shown in FIG. 9, and a variety of different arrangement of the second air holes 23 can be designed on the basis of the inner layer to achieve different degrees of anisotropy of stress distribution. Its characteristics are the same as those in Embodiment 1. This design idea is also within the protection scope of the present invention.

Preferably, the structures of the inner and outer layers of the cladding of the photonic crystal fiber in the present invention only use air hole arrays. This is because air hole arrays have already had a mature and perfect process with low preparation difficulty and high machining accuracy on the basis of the existing industrial level. In this embodiment, the photonic crystal fiber is fabricated by stacking-drawing process. According to the structural parameters of the photonic crystal fiber, the glass capillary with different sizes is stacked according to the arrangement. In order to facilitate the fixation of the stacked capillary, triangles based stacking is designed in the outer layer in this embodiment, and then the capillary is fixed by the casing to complete the preparation of the photonic crystal fiber preform. After that, the preform is drawn, and the process temperature, speed and time are strictly controlled to prevent uneven wire drawing and even wire breaking.

In summary, the present invention retains the existing optical design in the inner layer of the cladding, and improves the design and optimization of the mechanical properties in the outer layer of the cladding. On the basis of ensuring the optical properties to meet the requirements, the mechanical properties of the photonic crystal fiber are improved, so that the photonic crystal fiber has a certain anti-torsion ability, which is conducive to reducing the non-reciprocal phase difference generated by the magneto-optic Faraday effect, and is of certain significance to reduce the magnetic sensitivity of the FOG.

On the premise of not breaking away from the creative idea of the present invention, general technicians in this field can also make some modifications and improvements to the embodiments of the present invention, which belong to the protection scope of the present invention.

We claim:

1. An anti-torsion solid-core polarization-maintaining photonic crystal fiber based on anisotropy of stress distribution, the photonic crystal fiber comprising a core and a cladding that includes an inner layer arranged around the core and an outer layer between the inner layer and an outer wall of the cladding, wherein
    the inner layer has multiple layers of first air holes, each having a first diameter, arranged for constructing optical properties and two micron-size air holes arranged along an x-axis extending through a center of the inner layer for guaranteeing birefringence in the fiber, wherein the micron-size air holes are each larger than each of the first air holes;
    the outer layer has multiple layers of second air holes, each having a second diameter, arranged around a y-axis, wherein the y-axis is perpendicular to the x-axis, wherein the multiple layers of second air holes are arranged to be evenly distributed and enclosed in two equilateral triangles, each with one side parallel to the x-axis and corresponding to an inner border or an outer border of the outer layer of the cladding;
    the second diameter is different from the first diameter;
    the inner layer and the outer layer as a whole are symmetric with respect to the x-axis and the y-axis as a whole; and
    the multiple layers of second air holes are configured in a way as to cause the bending stiffness of the photonic crystal fiber along the x-axis to be different from the bending stiffness along the y-axis.

2. The photonic crystal fiber according to claim 1, wherein the outer wall of the cladding is spaced apart from the multiple layers of second air holes in the outer layer.

3. The photonic crystal fiber according to claim 1, wherein the bending stiffness of the photonic crystal fiber along the x-axis differs from the bending stiffness along the y-axis by 0-70%.

4. The photonic crystal fiber according to claim 1,
    wherein the second diameter of the second air holes is larger than the first diameter of the first air holes.

* * * * *